United States Patent
Feng et al.

(10) Patent No.: US 10,972,141 B2
(45) Date of Patent: Apr. 6, 2021

(54) METHOD FOR ESTIMATING ARRIVAL TIME BASED ON NOISE CANCELLATION

(71) Applicant: South China University of Technology, Guangzhou (CN)

(72) Inventors: Yizhi Feng, Guangzhou (CN); Pingping Yang, Guangzhou (CN); Jun Zhang, Guangzhou (CN); Gengxin Ning, Guangzhou (CN); Fei Ji, Guangzhou (CN)

(73) Assignee: South China University of Technology

( * ) Notice: Subject to any disclaimer, the term of this patent is extended or adjusted under 35 U.S.C. 154(b) by 0 days.

(21) Appl. No.: 16/966,123

(22) PCT Filed: Oct. 16, 2018

(86) PCT No.: PCT/CN2018/110448
§ 371 (c)(1),
(2) Date: Jul. 30, 2020

(87) PCT Pub. No.: WO2019/179084
PCT Pub. Date: Sep. 26, 2019

(65) Prior Publication Data
US 2021/0044312 A1   Feb. 11, 2021

(30) Foreign Application Priority Data

Mar. 23, 2018 (CN) .......................... 201810244043.2

(51) Int. Cl.
*H04B 1/12* (2006.01)
*G01S 5/02* (2010.01)
*G01S 11/02* (2010.01)
*H04B 1/10* (2006.01)

(52) U.S. Cl.
CPC .............. *H04B 1/12* (2013.01); *G01S 5/0215* (2013.01); *G01S 11/02* (2013.01); *H04B 1/1027* (2013.01)

(58) Field of Classification Search
CPC .. H04B 1/7183; H04B 1/71632; H04B 1/719; H04B 1/12; H04B 1/1027; H04L 25/4902; G01S 5/0215; G01S 11/02
See application file for complete search history.

(56) References Cited

U.S. PATENT DOCUMENTS

| 9,941,926 B2 | 4/2018 | Danev et al. |
| 2012/0063547 A1* | 3/2012 | Pietrzyk ............. H04B 1/71637 375/316 |
| 2015/0323642 A1* | 11/2015 | Mutz ......................... G01S 3/74 342/417 |

FOREIGN PATENT DOCUMENTS

| CN | 103297087 A | 9/2013 |
| CN | 106017479 A | 10/2016 |
| CN | 106131949 A | 11/2016 |

(Continued)

*Primary Examiner* — Sung S Ahn
(74) *Attorney, Agent, or Firm* — The Webb Law Firm

(57) ABSTRACT

A method for estimating arrival time based on noise cancellation includes transmitting, with a transmit terminal, an ultra-wideband pulse sequence; performing power sampling on a received ultra-wideband signal; averaging a power sampling sequence; carrying out a calculation to obtain a noise mean vector; using a sum-of-rank method to obtain a rank of a power mean column vector; setting a decision threshold; and performing time-of-arrival (TOA) estimation.

6 Claims, 2 Drawing Sheets

(56) References Cited

FOREIGN PATENT DOCUMENTS

| CN | 108521282 A | 9/2018 |
|---|---|---|
| WO | 2015135630 A1 | 9/2015 |

\* cited by examiner

METHOD FOR ESTIMATING ARRIVAL TIME BASED ON NOISE CANCELLATION

This application is the United States national phase of International Application No. PCT/CN2018/110448 filed Oct. 16, 2018, and claims priority to Chinese Patent Application No. 201810244043.2 filed Mar. 23, 2018, the disclosures of each of which are hereby incorporated by reference in their entireties.

FIELD OF THE INVENTION

The present invention, belonging to the field of wireless communication, relates to a pulse ultra-wideband signal positioning technology, particularly to a method for estimating arrival time based on noise cancellation.

BACKGROUND OF THE INVENTION

A pulse ultra-wideband signal is characterized by extremely high time resolution, strong penetrability and so on. In theory, it can provide ranging and positioning accuracy of centimeter or even millimeter level, and does not need modulation when transmitted, so the system complexity is low. Therefore, it has received wide attention in the high-precision positioning technology. Time-of-arrival (TOA) estimation, as a common method of the pulse ultra-wideband positioning technology, can make full use of the advantages of the pulse ultra-wideband technology, and has high ranging and positioning accuracy and low implementation complexity. The key to TOA estimation is how to detect the first path (FP), i.e., the direct path, in the multipath channel based on the signal at the receiving end, so it is particularly important to eliminate noise interference in the signal at the receiving end.

In the pulse ultra-wideband positioning system, there have been a lot of studies that have proposed various methods of TOA estimation, such as the maximum energy selection (MES) algorithm and the threshold crossing (TC) algorithm. The MES algorithm uses the time of the largest energy block as an estimated TOA value. However, in practice, the first path is often not the path with the strongest energy, which makes the performance of the MES algorithm poor. Therefore, many methods are based on the TC algorithm to detect the first path. The TC algorithm compares the output of the energy detection receiver with a fixed threshold, and uses the time of the first energy block crossing the threshold as an estimated TOA value. But this algorithm requires an optimal threshold obtained by complex design. In the case of complex channel model and unknown channel prior information, it is very difficult to set such an optimal threshold.

The invention patent "A Method for Estimating Arrival Time of Ultra-wideband Positioning System" with the publication number of CN103297087 and the publication date of Sep. 11, 2013 provides a threshold solution model based on the constant false alarm rate constraint; although the calculation process pre-orders the energy sequence and reduces the amount of calculation to complete the arrival time estimation, this invention does not eliminate the noise interference, and the method involves an iterative process for calculating the optimal threshold, with high time complexity. The invention patent "A Method for Estimating Arrival Time Based on Energy Mean Detection" with the publication number of CN106131949A and the publication date of Nov. 16, 2016 provides a method for setting an optimal normalized threshold and thereby setting a decision threshold based on a time-averaged maximum and minimum energy mean; although the use of multiple pulses for time averaging reduces the effect of noise on TOA estimation, this invention does not actively eliminate noise, and the effect needs to be improved. The invention patent "A method for Estimating Arrival Time of Signals in Strong Multipath Environment" with the publication number of CN106879068A and the publication date of Jun. 20, 2017 reduces the noise interference and the impact of signal transmission loss through the normalized filtering of the received signal; however, this invention can only suppress the sudden noise in the received signal.

To sum up, in the existing TOA estimation methods, the influence of noise is not sufficiently eliminated, the threshold setting method is complicated and has performance defects in practice, and the high-precision positioning algorithm needs to be improved.

CONTENTS OF THE INVENTION

To solve the above-mentioned shortcomings in the prior art, a purpose of the present invention is to provide a method for estimating arrival time based on noise cancellation, improving the accuracy of TOA estimation by denoising the signal at the receiving end.

The purpose of the present invention can be achieved through the follow technical solution:

A method for estimating arrival time based on noise cancellation is provided, comprising the following steps:

S1. A transmit terminal transmits an ultra-wideband pulse sequence;

S2. a received ultra-wideband signal r(t) passes through a low-noise amplifier and is then band-pass filtered, then it passes a square-law detector to produce a power signal, which is then sampled to obtain a power sampling sequence $\{A_{n,l,k}\}$ of the received signal, where $A_{n,l,k}$ represents a power sampling value obtained for a k-th time chip in an l-th frame in an n-th symbol, n=1, 2, ..., $N_s$, l=1, 2, ..., $N_f$, k=1,2, ..., $N_c$, $N_s$ represents the number of symbols of a transmitted signal, $N_f$ represents the number of frames in each symbol, and $N_c$ represents the number of time chips in each frame;

S3. the power sampling sequence $\{A_{n,l,k}\}$ is averaged to eliminate noise and obtain a power average matrix V of the received signal, wherein an element $V_{n,k}$ of an n-th row and a k-th column of V is determined by $$V_{n,k} = \frac{1}{N_f} \sum_{l=1}^{N_f} A_{n,l,k},$$

and the power mean column vector formed by an element of a k-th column of V is denoted as $V^k$;

S4. a first time chip is extracted from the power sampling sequence $\{A_{n,l,k}\}$ to form a noise sequence $\{A_{n,l,k}\}$, where $A_{n,l,k}$ is the value of $A_{n,l,k}$ at k=1; $\{A_{n,l,k}\}$ is averaged to get a noise mean vector $V^{ref}$, wherein an n-th element, $V^{ref}_n$, of $V^{ref}$ is determined by $$V_n^{ref} = \frac{1}{N_f} \sum_{l=1}^{N_f} A_{n,l,1};$$

S5. a sum-of-rank method is adopted for the power mean column vector $V^k$ and the noise mean vector $V^{ref}$ to obtain a rank $R_1(k)$ of $V^k$;

S6. a decision threshold $\eta$ of TOA estimation is set according to the rank $R_1(k)$; and S7. a position ½ of the time chip that first exceeds the decision threshold $\eta$ is selected as an estimated arrival time.

Furthermore, the received ultra-wideband signal r(t) is determined by $$r(t) = \left(\sum_{n=1}^{N_s}\sum_{l=1}^{N_f} \omega(t-(n-1)T_s-(l-1)T_f-\tau_{guard})\right)*h(t)+n(t),$$

where $\omega(t)$ is an ultra-wideband pulse, with the pulse width equal to a time chip period $T_c$; $T_s$ and $T_f$ are a symbol period and a frame period of the transmitted signal, respectively; in each frame, a time interval $\tau_{guard}$ is set as a guard interval before the position of the ultra-wideband pulse; n(t) represents an additive Gaussian white noise with a mean value of zero and a bilateral power spectral density of $$\frac{N_0}{2};$$

$$h(t) = \sum_{l=1}^{L} \alpha_l \delta(t-\tau_l)$$

is a unit impulse response of a channel, where $\alpha_l$ and $\eta_l$ are a complex attenuation factor and delay of an l-th path, respectively, L is a multipath number, and $\delta(t)$ is a Dirac $\delta$ function.

Furthermore, the power sampling sequence $A_{n,l,k}$ is determined by $A_{n,l,k}=r^2_{bpf}(n-1)T_s+(l-1)T_f+(k-1)T_c)+\tau_{position}$, where $T_s$, $T_f$ and $T_c$ are a symbol period, a frame period, and a time chip period of the transmitted signal, respectively, $\tau_{positive}$ is in the range of (0,T) and indicates the sampling position in the time chip, $r_{bpf}(t)$ is output of a band-pass filter, and $^2_{bpf}(t)$ is the power signal obtained after passing through the square-law detector.

Furthermore, the sum-of-rank method is carried out in the ascending order of k, where k=1, 2, . . . , $N_c$; the method comprises the following steps:

S501. for each k, putting the elements in $V^k$ and $V^{ref}$ together, and sorting these elements according to the magnitude from small to large to form an ordered sequence $W^k$; an n-th element, $V_{n,k}$, in $V^k$ has an ordinal number in the ordered sequence $W^k$, the ordinal number being the rank of the element and written as $r^1_{n,k}$;

S502. for each k, the rank $R_1(k)$ of the column vector $V^k$ is obtained according to $r^1_{n,k}$, where $R_1(k)$ is determined by a formula $$R_1(k) = \sum_{n=1}^{N_s} r^1_{n,k}, k=1, 2, \ldots, N_c.$$

Furthermore, the setting of the decision threshold $\eta$ comprises the following steps:

S601. the rank $R_1(k)$ of $V^k$ constitutes a row vector $R_1=(R_1(1), R_1(2), \ldots, R_1(N_c))$ according to an ascending order of k; getting standard normal of $R_1$ to denote as Z, i.e., $Z=(R_1-(2N^2_s+N)/2)/\sqrt{(2N^3_s+N^2_s)/12}$;

S602. setting a decision threshold $$\eta = \frac{3}{4}Z_{max},$$

where $Z_{max}$ is the maximum value of an element in Z.

Furthermore, the selecting a time chip comprises the following steps:

S701. according to the ascending order of k, the element Z(k) in Z is sequentially compared with the decision threshold $\eta$;

S702. in the vector Z, the element that first exceeds the decision threshold $\eta$ is denoted as $Z(k_0)$; the position ½ of the time chip where $Z(k_0)$ is located is the estimated arrival time; the subscript of the time chip where the element $Z(k_0)$ is located is denoted as $k_0$, i.e., the time chip where the element $Z(k_0)$ is located is a $k_0$-th time chip; thus the estimated value $\tau$ of the arrival time is determined by the calculation of $$\tau = \left(k_0 - \frac{1}{2}\right)T_c - \tau_{guard}.$$

The present invention has the following advantages and effects relative to the prior art:

1. The averaging operation on the power sampling sequence provided by the present invention can effectively eliminate the noise in a received signal and improve the precision of arrival time estimation. Moreover, this noise cancellation method is independent and does not depend on the acquisition of channel prior information, suitable for practical ultra-wideband positioning systems.

2. According to the present invention, a sum-of-rank method is employed for identifying an ultra-wideband pulse signal and a noise signal, rather than directly comparing the magnitude of the two. This makes the identification process easier to operate, the results are more accurate and reliable, and effects of outliers can effectively be eliminated.

3. The threshold setting method adopted by the present invention is simple in form, reliable and effective.

DETAILED DESCRIPTION OF THE EMBODIMENTS

In order to make the purpose, technical solution, and advantages of the example of the present invention clearer, the technical solution in the example of the present invention will be described clearly and completely in combination with the drawings in the example of the present invention. Obviously, the described example is part but not all of the examples of the present invention. All the other examples obtained by those of ordinary skill in the art according to the example of the present invention without making any inventive effort all fall within the scope of protection of the present invention.

EXAMPLE

Figure 1:
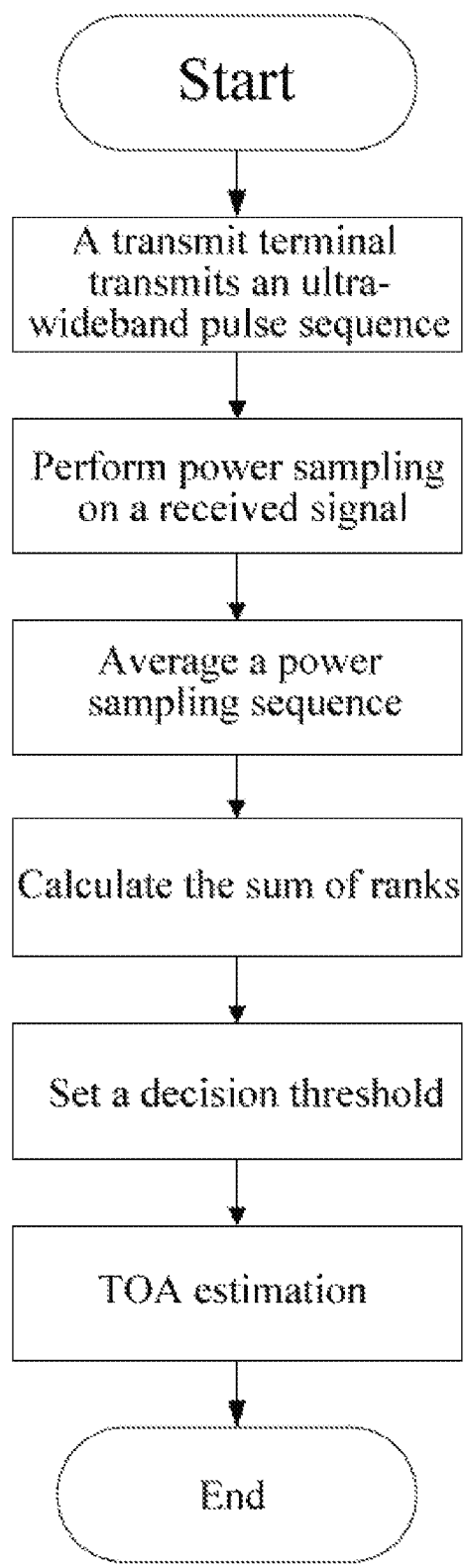
FIG. 1 is a flowchart of the method for estimating arrival time based on noise cancellation disclosed in the present invention.
Figure 2:
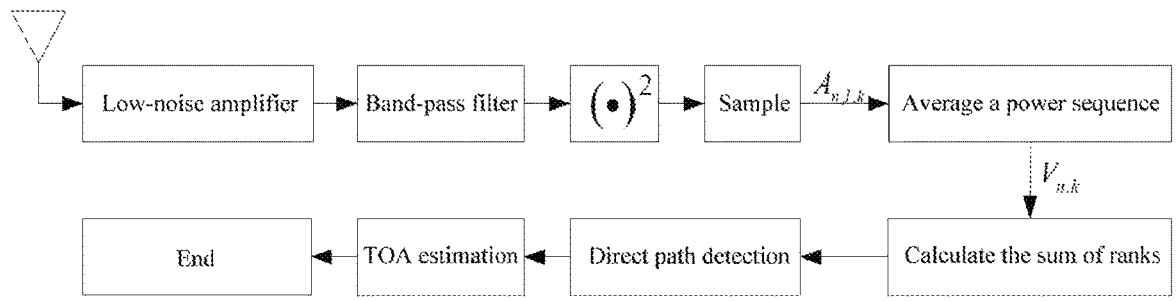
FIG. 2 is a flowchart of signal processing at a receiving end in the present invention.
Figure 3:
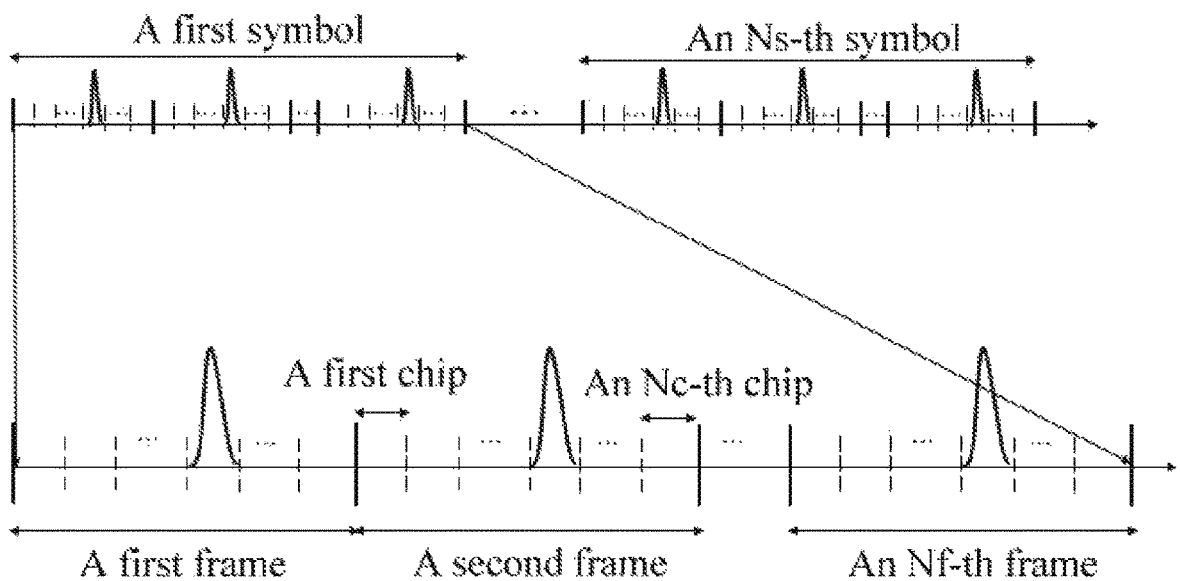
FIG. 3 is a structural diagram of a transmitted pulse sequence in the present invention.

This example discloses a method for estimating arrival time based on noise cancellation, as shown in FIGS. 1 and 2. The method comprises the following steps:

S1. The transmitting end sends an ultra-wideband pulse sequence with the structure shown in FIG. 3. In FIG. 3, $N_s$ represents the number of symbols of a transmitted signal, $N_f$ represents the number of frames in each symbol, and $N_c$ represents the number of time chips in each frame; the corresponding symbol period, frame period, and time chip period are denoted as $T_s$, $T_f$ and $T_c$, respectively. In this example, the specific parameters are set as follows: $N_s$=30, $N_f$=40, $N_c$=200, $T_c$=1 ns, $T_f$=$N_c \times T_c$=200 ns, and $T_s$=$N_f \times T_f$=8000 ns.

S2. A received ultra-wideband signal r(t) passes through a low-noise amplifier and is then band-pass filtered, then it passes a square-law detector to produce a power signal $r^2_{bpf}(t)$, which is then sampled to obtain a power sampling sequence $\{A_{n,l,k}\}$ of the received signal, where $A_{n,l,k}$ represents a power sampling value obtained for a k-th (k=1, 2, ..., $N_c$) time chip in an l-th (l=1, 2, ..., $N_f$) frame in an n-th (n=1, 2, ..., $N_s$) symbol; S2 specifically comprises the following steps:

S201. a received ultra-wideband signal r(t) passes through a low-noise amplifier and then a band-pass filter to remove the out-of-band noise; the received ultra-wideband signal with noise, r(t), is determined by $$r(t) = \left( \sum_{n=1}^{N_s} \sum_{l=1}^{N_f} \omega(t - (n-1)T_s - (l-1)T_f - \tau_{guard}) \right) * h(t) + n(t);$$

$$\omega(t) = e^{-\frac{\pi t^2}{2\theta^2}}$$

is defined as a transmitted ultra-wideband pulse, with the pulse width equal to a time chip period $T_c$, where $\theta = 0.3 \times 10^{-9}$; in each frame, a time interval $\tau_{guard}$=80 ns is set as a guard interval before the position of the ultra-wideband pulse; n(t) represents an additive Gaussian white noise with a mean value of zero and a bilateral power spectral density of $$\frac{N_0}{2},$$

which satisfies $$N_0 = \frac{E_x}{SNR},$$

where SNR represents a signal-to-noise power ratio (in dB); in this example, the value range of SNR is set as [0,30], and the energy of a single ultra-wideband pulse is set as $E_x$=3.0051×10$^{-10}$J; h(t) is a unit impulse response of a channel; in this example, the channel model considered is an ultra-wideband channel of IEEE802.15.4a CM3, and the unit impulse response of the channel is $$h(t) = \sum_{l=0}^{L} \sum_{k=0}^{K} \alpha_{k,l} e^{j\phi_{k,l}} \delta(t - T_l - \tau_{k,l}),$$

where L is the number of clusters and obeys the Poisson distribution, and the probability density function is $$pdf_L(L) = \frac{5.4^L e^{-5.4}}{L!},$$

the number of multipaths received in the l-th cluster is defined as K=100, and the phase $\varphi_{k,l}$ is a uniformly distributed random variable on [0, 2π]; the delay $T_l$ of the l-th cluster satisfies the Poisson distribution $p(T_l|T^{l-1})$=0.047$e^{-0.047(T_l-T_{l-1})}$, $T_0$=0; the relative delay $\tau_{k,l}$ of the k-th multipath component with respect to the arrival time $T_l$ of the k-th cluster satisfies the mixed Poisson distribution $p(\tau_{k,l}|\tau_{(k-l),l})$= $\beta\lambda_1 e^{-\lambda_1(\tau_{k,l}-\tau_{(k-1),l})}$+$(\beta-1)\lambda_2 e^{-\lambda_2(\tau_{k,l}-\tau_{(k-1)})}$,$\tau_{0,l}$=0 where the mixing probability is β=0.0184, and the path arrival rate is $\tau_1$=0.19$^{-1}$, $\tau_2$=2.97 ns$^{-1}$; the magnitude attenuation factor $\alpha_{k,l}$ of the k-th path in the l-th cluster satisfies $$E\{|\alpha_{k,l}|^2\} = \left(1 - \chi e^{\frac{\tau_{k,l}}{\gamma_{rise}}}\right) e^{\frac{\tau_{k,l}}{\gamma_1}} \cdot \frac{\gamma_1 + \gamma_{rise}}{\gamma_1} \cdot \frac{1}{\gamma_1 + \gamma_{rise}(1-\chi)},$$

where the attenuation coefficient of the first path is X=0.86, the growth rate of the power delay profile is γrise=15.21, and the attenuation coefficient is $\gamma_1$=11.84; the output of the band-pass filter is denoted as $r_{bpf}(t)$;

S202. the received signal after the band-pass filtering passes through the square-law detector to obtain a power signal, which is denoted as $r^2_{bpf}(t)$;

S203. the power signal is sampled to obtain a power sampling sequence $\{A_{n,l,k}\}$ of the received signal;

wherein $A_{n,l,k}$ represents a power sampling value obtained for a k-th (k=1,2, ..., $N_c$) time chip in an l-th (l=1, 2, ..., $N_f$) frame in an n-th (n=1, 2, ..., $N_s$) symbol; the power sampling sequence $A_{n,l,k}$ is determined by $A_{n,l,k}$=$r^2_{bpf}$((n-1)$T_s$+(l-1)$T_f$+(k-1)$T_c$)+$\tau_{position}$, where $T_s$ and $T_f$ are a symbol period and a frame period of the transmitted signal described in step S201, respectively, $T_c$ is a time chip period, $\tau_{position}$ is in the range of (0, T) with $$\tau_{position} = \frac{1}{2}T_c = 0.5 \text{ ns}$$

in this example and indicates the sampling position in the time chip, and $\tau^2_{bpf}(t)$ is the power signal described in the step S202.

S3. The power sampling sequence $\{A_{n,l,k}\}$ described in the step S2 is averaged to obtain a power average matrix V of the received signal, where the element $V_{n,k}$ in the n(n=1, 2, ..., N)-th row and the k(k=1, 2, ..., N)-th column of V is determined by $$V_{n,k} = \frac{1}{N_f} \sum_{l=1}^{N_f} A_{n,l,k},$$

and the power mean column vector formed by the elements in the k(k=1, 2, . . . , N)-th column of V is denoted as $V^k$.

S4. A first time chip is extracted from the power sampling sequence $\{A_{n,l,k}\}$ described in the step S2 to form a noise sequence $\{A_{n,l,k}\}$, where $A_{n,l,k}$ is the value of $A_{n,l,k}$ at k=1; $\{A_{n,l,k}\}$ is averaged to get a noise mean vector $V^{ref}$, wherein an n(n=1, 2, . . . ,$N_s$)-th element, $V^{ref}_n$, of $V^{ref}$ determined by $$V_n^{ref} = \frac{1}{N_f} \sum_{l=1}^{N_f} A_{n,l,1}.$$

S5. A sum-of-rank method is adopted for the power mean column vector $V^k$ (k=1, 2, . . . , $N_c$) described in the step S3 and the noise mean vector $V^{ref}$ described in the step S4 to obtain a rank $R_1(k)$ of $V^k$; S5 specifically comprises the following steps:

S501. for each $k^{(k=1, 2, \ldots, N_C)}$, putting the elements in $V^k$ and $V^{ref}$ together, and sorting these elements according to the magnitude from small to large to form an ordered sequence $W^k$; an n(n=1, 2, . . . , $N_c$)-th element, $V_{n,k}$, in $V^k$ has an ordinal number in the ordered sequence $W^k$, the ordinal number being the rank of the element and written as $r^1_{n,k}$ (n=1, 2, . . . , $N_s$; k=1, 2, . . . , $N_c$);

S502. for each $k^{(k=1, 2, \ldots, N_C)}$, the rank $R_1(k)$ of the column vector $V^k$ is obtained according to $r^1_{n,k}$ $(n=1,2, \ldots, N_s; k=1, 2, \ldots, N_c)$ described in the step S501, where $R_1(k)$ is determined by a formula $$R_1(k) = \sum_{n=1}^{N_s} r^1_{n,k}, k = 1, 2, \ldots, N_c.$$

S6. A decision threshold $\eta$ of TOA estimation is set according to the rank $R_1(k)$ described in the step S5; S6 specifically comprises the following steps:

S601. the rank $R_1(k)$ of $V^k$ (k=1, 2, . . . , $N_c$) described in the step S502 constitutes a row vector $R_1=(R_1(1), R_1(2), \ldots, R_1(N_c))$ according to an ascending order of k; getting standard normal of $R_1$ to denote as Z, i.e., $$Z = (R_1 - (2N_s^2 + N_s)/2) \Big/ \sqrt{(2N_s^3 + N_s^2)/12} = \frac{R_1 - 915}{67.6};$$

S602. setting a decision threshold $$\eta = \frac{3}{4} Z_{max},$$

where $Z_{max}$ is the maximum value of an element in Z described in the step S601.

S7. TOA estimation: According to the ascending order of $k^{(k=1,2, \ldots, N_C)}$, the element Z(k) in Z described in the step S601 is sequentially compared with the decision threshold $\eta$; if the element that first exceeds the decision threshold $\eta$ is $Z(k_0)$, the position ½ of the time chip where $Z(k_0)$ is located is the estimated arrival time; specifically, if the element that first exceeds the decision threshold $\eta$ is $Z(k_0)$, and the subscript of the time chip where the element $Z(k_0)$ is located is denoted as $k_0$, the estimated value $\tau$ of TOA is determined by the calculation of $$\tau = \left(k_0 - \frac{1}{2}\right)T_c - \tau_{guard} = k_0 - 80.5 \text{ (ns)}.$$

The above-described example is a preferred embodiment of the present invention, but the embodiments of the present invention are not limited thereto, and any other alterations, modifications, substitutions, combinations and simplifications should be equivalent replacements and included in the scope of protection of the present invention.

The invention claimed is:

1. A method for estimating arrival time based on noise cancellation, comprising:

transmitting, with a transmit terminal, an ultra-wideband pulse sequence;

passing a received ultra-wideband signal r(t) through a low-noise amplifier and a band-pass filter, wherein the amplified and filtered received ultra-wideband signal r(t) passes a square-law detector to produce a power signal, wherein the power signal is sampled to obtain a power sampling sequence $\{A_{n,l,k}\}$ of the received signal, where $A_{n,l,k}$ represents a power sampling value obtained for a k-th chip in an l-th frame in an n-th symbol, n=1, 2, . . . , $N_s$, l=1, 2, . . . , $N_f$, k=1,2, . . . , $N_c$, $N_s$ represents the number of symbols of a transmitted signal, $N_f$ represents the number of frames in each symbol, and $N_c$ represents the number of chips in each frame;

averaging the power sampling sequence $\{A_{n,l,k}\}$ to eliminate noise and obtain a power average matrix V of the received signal, wherein an element $V_{n,k}$ of an n-th row and a k-th column of V is determined according to $$V_{n,k} = \frac{1}{N_f} \sum_{l=1}^{N_f} A_{n,l,k},$$

and a power mean column vector formed by an element of a k-th column of V is denoted as $V^k$;

extracting a first chip from the power sampling sequence $\{A_{n,l,k}\}$ to form a noise sequence $\{A_{n,l,k}\}$, where $A_{n,l,k}$ is the value of $A_{n,l,k}$ at k=1; $\{A_{n,l,k}\}$ is averaged to get a noise mean vector $V^{ref}$, wherein an n-th element, $V^{ref}_n$, of $V^{ref}$ is determined according to $$V_n^{ref} = \frac{1}{N_f} \sum_{l=1}^{N_f} A_{n,l,1};$$

adopting a sum-of-rank method for the power mean column vector $V^k$ and the noise mean vector $V^{ref}$ to obtain a rank $R_i(k)$ of $V^k$;

setting a decision threshold $\eta$ of Time-of-Arrival (TOA) estimation according to the rank $R_i(k)$; and selecting a position ½ of a time chip that first exceeds the decision threshold $\eta$ as an estimated arrival time.

2. The method for estimating arrival time based on noise cancellation according to claim 1, wherein the received ultra-wideband signal r(t) is determined according to $$r(t) = \left(\sum_{n=1}^{N_s}\sum_{l=1}^{N_f} \omega(t-(n-1)T_s-(l-1)T_f-\tau_{guard})\right)*h(t)+n(t),$$

where $\omega(t)$ is an ultra-wideband pulse, with the pulse width equal to a chip period $T_c$, $T_s$ and $T_f$ are a symbol period and a frame period of the transmitted signal, respectively; in each frame, a time interval $\tau_{guard}$ is set as a guard interval before the position of the ultra-wideband pulse; $n(t)$ represents an additive Gaussian white noise with a mean value of zero and a bilateral power spectral density of $$\frac{N_0}{2}; h(t) = \sum_{l=1}^{L} \alpha_l \delta(t-\tau_l)$$

is a unit impulse response of a channel, where $\alpha_l$ and $\tau_l$ are a complex attenuation factor and delay of an l-th path, respectively, L is a multipath number, and $\delta(t)$ is a Dirac $\delta$ function.

3. The method for estimating arrival time based on noise cancellation according to claim 1, wherein the power sampling sequence $A_{n,l,k}$ is determined according to $A_{n,l,k}=r^2_{bpf}((n-1)T_s+(l\_31\ 1)T_f+(k-1)T_c)+\tau_{position}$, where $T_s$, $T_f$, and $T_c$ are a symbol period, a frame period, and a chip period of the transmitted signal, respectively, $\tau_{position}$ is in the range of $(0,T_c)$ and indicates the sampling position in the chip, $r_{bpf}(t)$ is output of a band-pass filter, and $r^2_{bpf}(t)$ is the power signal obtained after passing through the square-law detector.

4. The method for estimating arrival time based on noise cancellation according to claim 1, wherein the sum-of-rank method is carried out in an ascending order of k, where k=1, 2, ..., $N_c$, and wherein the sum-of-rank method comprises:
for each k, putting the elements in $V^k$ and $V^k$ together, and sorting the elements according to the magnitude from small to large to form an ordered sequence $W^k$; where an n-th element, $V_{n,k}$, in $V^k$ has an ordinal number in the ordered sequence $W^k$, the ordinal number being the rank of the element and written as $r^1_{n,k}$;
for each k, the rank $R_1(k)$ of the column vector $V^k$ is obtained according to $r^1_{n,k}$, where $R_1(k)$ is determined according to $$R_1(k) = \sum_{n=1}^{N_s} r^1_{n,k}, k = 1, 2, \ldots, N_c.$$

5. The method for estimating arrival time based on noise cancellation according to claim 1, wherein the setting of the decision threshold $\eta$ comprises
the rank $R_1(k)$ of $V^k$ constitutes a row vector $R_1=(R_1(1), R_1(2), \ldots, R_1(N_c))$ according to an ascending order of k; getting standard normal of $R_1$ to denote as Z, where $Z=(R_1-(2N^2_s+N)/2)/\sqrt{(2N^3_s+N^2_s)/12}$;
setting a decision threshold $$\eta = \frac{3}{4} Z_{max},$$

where $Z_{max}$ is the maximum value of an element in Z.

6. The method for estimating arrival time based on noise cancellation according to claim 1, wherein the selecting a positon ½ of a time chip comprises
sequentially comparing, according to the ascending order of k, the element Z(k) in Z with the decision threshold $\eta$;
in the vector Z, the element that first exceeds the decision threshold $\eta$ is denoted as $Z(k_0)$; the position ½ of the time chip where $Z(k_0)$ is located is the estimated arrival time; the subscript of the time chip where the element $Z(k_0)$ is located is denoted as $k_0$, where the time chip where the element $Z(k_0)$ is located is a $k_0$-th chip; determining the estimated value $\tau$ of the arrival time according to $$\tau = \left(k_0 - \frac{1}{2}\right)T_c - \tau_{guard}.$$

* * * * *

UNITED STATES PATENT AND TRADEMARK OFFICE
CERTIFICATE OF CORRECTION

Page 1 of 2

PATENT NO. : 10,972,141 B2
APPLICATION NO. : 16/966123
DATED : April 6, 2021
INVENTOR(S) : Yizhi Feng et al.

It is certified that error appears in the above-identified patent and that said Letters Patent is hereby corrected as shown below:

On the Title Page

Item (73), Assignee, Line 1, after "Technology" insert -- (CN) --

In the Claims

Column 8, Line 28, Claim 1, after "k-th" insert -- time --

Column 8, Line 29, Claim 1, delete "k=1,2," and insert -- k=1, 2, --

Column 8, Line 32, Claim 1, after "number of" insert -- time --

Column 8, Line 34, Claim 1, delete "$\{^A{}_{n,l,k}\}$" and insert -- $\{A_{n,l,k}\}$ --

Column 8, Line 47, Claim 1, after "first" insert -- time --

Column 8, Line 48, Claim 1, delete "$\{A_{n,l,k}\}$," and insert -- $\{A_{n,l,1}\}$, --

Column 8, Line 48, Claim 1, delete "$A_{n,l,k}$" and insert -- $A_{n,l,1}$ --

Column 8, Line 49, Claim 1, delete "$\{A_{n,l,k}\}$" and insert -- $\{A_{n,l,1}\}$ --

Column 8, Line 60, Claim 1, delete "$R_i(k)$" and insert -- $R_1(k)$ --

Column 8, Line 62, Claim 1, delete "$R_i(k)$;" and insert -- $R_1(k)$; --

Column 8, Line 63, Claim 1, delete second occurrence "a" and insert -- the --

Column 9, Line 7, Claim 2, after "to a" insert -- time --

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued) Page 2 of 2
U.S. Pat. No. 10,972,141 B2

Column 9, Line 26, Claim 3, delete "(1_31 1)" and insert -- (l-1) --

Column 9, Line 27, Claim 3, after "and a" insert -- time --

Column 9, Line 28, Claim 3, after "in the" insert -- time --

Column 10, Line 9, Claim 5, delete "comprises" and insert -- comprises: --

Column 10, Line 14, Claim 5, delete "$Z=(R_1-(2N^2_s+N)/2)/$" and insert -- $Z=(R_1-(2N^2_s+N_s)/2)/$ --

Column 10, Line 25, Claim 6, delete "a" and insert -- the --

Column 10, Line 25, Claim 6, delete "comprises" and insert -- comprises: --

Column 10, Line 34, Claim 6, after "$k_0$-th" insert -- time --